United States Patent [19]

Ruzicka

[11] Patent Number: 5,763,811
[45] Date of Patent: Jun. 9, 1998

[54] INTERNAL WEAPON CARRIAGE SYSTEM FOR WIDE BODY AIRCRAFT

[75] Inventor: Dennis E. Ruzicka, Enumclaw, Wash.

[73] Assignee: The Boeing Company, Seattle, Wash.

[21] Appl. No.: 833,301

[22] Filed: Apr. 4, 1997

[51] Int. Cl.⁶ .................... B64D 1/04; B64C 1/22
[52] U.S. Cl. .......................... 89/1.51; 244/137.1
[58] Field of Search ........................... 89/1.51, 1.59, 89/1.816, 1.819, 1.815, 1.8; 244/136, 137.1, 118.1, 118.2, 137.3

[56] References Cited

U.S. PATENT DOCUMENTS

| | | | |
|---|---|---|---|
| 2,363,750 | 11/1944 | Schmued | 89/1.51 |
| 2,741,159 | 4/1956 | Procos | 89/1.51 |
| 2,858,774 | 11/1958 | Batten | 244/137.1 |
| 2,937,573 | 5/1960 | Gantschnigg | |
| 3,371,891 | 3/1968 | Brader, Sr. et al. | 244/137.3 |
| 3,520,502 | 7/1970 | Smethers | |
| 4,161,301 | 7/1979 | Beardsley et al. | |
| 4,208,949 | 6/1980 | Boilsen | 89/1.815 |
| 4,256,012 | 3/1981 | Cowart et al. | |
| 4,697,764 | 10/1987 | Hardy et al. | |
| 4,923,148 | 5/1990 | Fillingham et al. | 89/1.51 |
| 5,186,417 | 2/1993 | Pritchard | 244/137.1 |

Primary Examiner—Charles T. Jordan
Assistant Examiner—Theresa M. Wesson
Attorney, Agent, or Firm—Christensen O'Connor Johnson & Kindness PLLC

[57] ABSTRACT

A weapons launching system (20) is located in an internal weapons storage compartment of an airplane, preferably a widebody aircraft. The system includes a monorail assembly (22) supported by a rail frame (24), and a number of carriage trucks (26) movably engaged with the monorail assembly (22). The carriage trucks (26) deliver weapons (27) via the monorail assembly (22) to a launch bay (28) located near one end of the storage compartment. The carriage trucks (26) include handling-release units (30) for picking up and moving weapons (27) within the storage compartment and for releasing the weapons (27) out the launch bay (28). A portion of the weapons are initially held by the handling-release units (30), while the remaining weapons are supported on stationary support units (34) located in the rail frame (24). An automatic launching control system (36) causes translation of the carriage trucks (26) along the monorail assembly (22) and activation of the handling-release units (30) and stationary support units (34). The carriage trucks (26) are used to quickly deliver weapons (27) to the launch bay (28) in an orderly, sequential manner. The carriage trucks (26) may also be used initially to load weapons (27) in the storage compartment.

18 Claims, 10 Drawing Sheets

INTERNAL WEAPON CARRIAGE SYSTEM FOR WIDE BODY AIRCRAFT

FIELD OF THE INVENTION

The present invention relates to missile deployment systems for widebody aircraft, and more particularly, to carriage assemblies for loading, carrying, and deploying weapons from an aircraft internal compartment during flight.

BACKGROUND OF THE INVENTION

Significant changes in geo-political alliances have caused equally significant changes in national defensive force structures and operating methods, both in the United States and elsewhere. Concurrently, technology advancements have resulted in operational standoff tactical cruise missiles that have the reliability, range, and accuracy sufficient to effectively destroy both fixed and mobile targets. These two realities have resulted in reductions in the number of available strategic aircraft bombers, and in the number of operating base sites outside of the continental United States. This, in turn, has created a need to have the ability to deliver significant numbers of cruise missiles to threat areas at long distance, both in minimum time and with as few dedicated bombers as possible. The present invention is directed to fulfilling this need.

SUMMARY OF THE INVENTION

In accordance with aspects of the present invention, a weapons launching system is provided that is capable of being quickly configured in an aircraft storage compartment. The weapons launching system includes a monorail assembly supported by a rail frame and a number of carriage trucks movably engaged with the monorail assembly. The rail frame is supported on a pallet that is located inside the aircraft storage compartment. The carriage trucks deliver weapons via the monorail assembly to one or more launch bays located near one end of the aircraft storage compartment. Each carriage truck includes a handling-release unit for picking up and restraining weapons and drive components for moving the truck and weapon along the monorail assembly. The handling-release units are further capable of releasing the weapons at the launch bay.

In accordance with further aspects of this invention, the monorail assembly includes a plurality of interconnect monorails. The monorails are longitudinally-oriented to extend substantially the length of the storage compartment and are attached to an upper portion of the rail frame. The monorails converge to form at least one sinoular monorail that extends directly to a launch bay. There are preferably two launch bay sites in the rear portion of the aircraft. The monorail assembly may be divided into operably separate sections. In one preferred embodiment, the monorail assembly is divided between left- and right-hand sections, relative to the aircraft longitudinal centerline. In this embodiment, the monorail assembly has a total of six interconnected and laterally spaced monorails. Three monorails are used in the left-hand section, and three monorails are used in the right-hand section. In a first preferred embodiment, the number of carriage trucks is between about 18 to about 24 trucks. In a second preferred embodiment, the number of carriage trucks is between about 8 to about 16 trucks.

In accordance with other aspects of this invention, to reduce configuration time, the monorail assembly, rail frame, and pallet may be formed as individual units having monorail subsegments mounted to subframe members that are anchored to subpallets. The individual units connect end-to-end via a latching mechanism, with the monorails aligning longitudinally between individual units.

A portion of the weapons are initially held by handling-release units, while the remaining weapons are supported on stationary support units located at specific locations in the rail frame and/or on the pallet. Preferably, about one-half of the total weapons to be launched are engaged with carriage trucks and the other half are supported on stationary support units. Therefore, the carriage trucks are used and reused to deliver weapons to the launch bay. The carriage trucks transport weapons to the launch bay in an orderly, sequential manner. The carriage trucks may also be used initially to load weapons to the storage compartment. Preferably, there are approximately equal numbers of carriage trucks as there are stationary support units. In one preferred embodiment for use in launching forty (40) weapons, there are twenty (20) carriage trucks. In another preferred embodiment for use in launching thirty (30) weapons, there are fifteen (15) carriage trucks.

In accordance with yet further aspects of this invention, the stationary support units are preferably connected to a lower region of the pallet or rail frame, directly beneath a monorail. Each stationary support unit includes a base of semicircular cross-section with opposed restraining arms rotatably connected to base edges. A weapon is cradled in the base, with the arms clasping about the weapon to secure it therein. The monorails are attached to an upper portion of the rail frame, and the stationary support units are attached to either the rail frame or the pallet at a location directly beneath a monorail.

In accordance with yet other aspects of this invention, the weapons launching control system further includes an automatic launching control system in communication with the carriage trucks for controlling the translation of the carriage trucks along the monorail assembly and for activating the handling-release units. The automatic launching control system further coordinates the opening and closing of the stationary support units. The automatic launching control system causes the carriage trucks to transport weapons to the launch bay in a predetermined sequential order. In one embodiment, carriage trucks unload weapons from left- and right-hand portions of the storage compartment in alternating fashion. The control system may additionally be used to initially load weapons into the storage compartment in a controlled manner.

In accordance with still further aspects of the present invention, a method of launching weapons from an aircraft storage compartment through a launch bay includes delivering weapons in a sequential manner using a number of carriage trucks translatable on a monorail assembly located in the storage compartment. The method further includes returning the carriage trucks from the launch bay via the monorail assembly in order to pick up and deliver additional weapons positioned in the storage compartment to the launch bay. The additional weapons are supported by stationary support units located in the storage compartment. There are about twice as many weapons as there are carriage trucks. In a preferred embodiment, the number of carriage trucks is in the range of about 16 to about 20 trucks.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Described below are embodiments of a weapons launching system formed in accordance with the present invention. These embodiments are illustrated in FIGS. 1–11 as applied to a widebody aircraft, e.g., a Boeing 747–400 freighter. A widebody aircraft is preferred for its long range and maximum stores capability. The present invention, however, may be applied to narrow body and other types of aircraft, both commercial and military. The important requirement is that a storage compartment exists, or may be made to exist, to accommodate the various features described below. The use of a widebody aircraft is therefore meant to be illustrative and not limiting.

Figure 1:
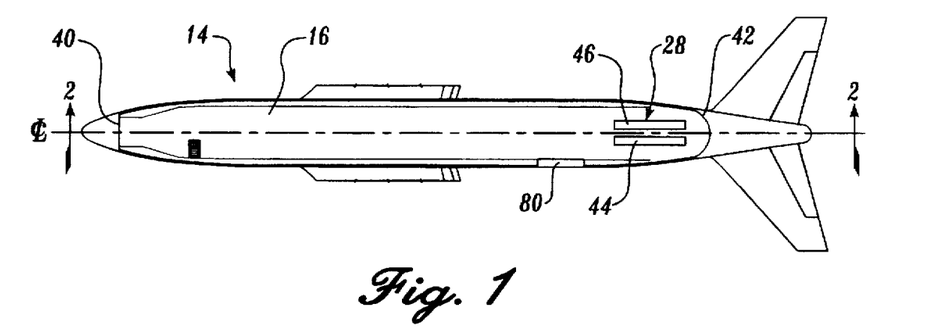
FIG. 1 is a plan view of an aircraft storage compartment suitable for receiving a weapon launching system formed in accordance with the present invention.
Figure 2:
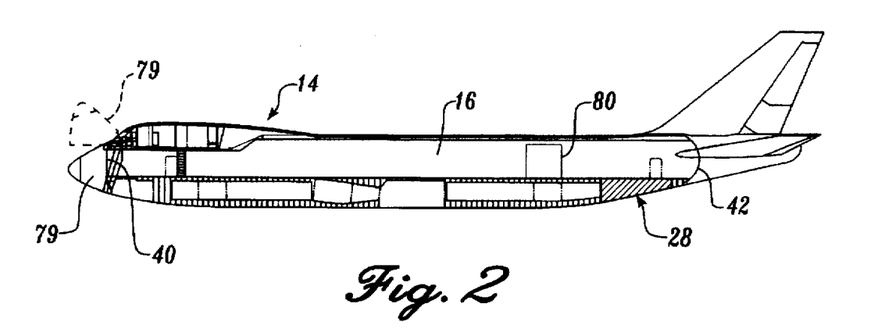
FIG. 2 is a side elevational view along line 2—2 of the compartment of FIG. 1.

Referring to FIGS. 1 and 2, the aircraft 14 includes an internal weapons storage compartment 16 within which a weapons launching system 20 (FIGS. 3–14) formed in accordance with the present invention is located. As illustrated in the embodiments of FIGS. 3–13, the weapons launching system 20 generally includes a monorail assembly 22 supported by a rail frame 24, and a number of carriage trucks 26 movably engaged with the monorail assembly 22. The carriage trucks 26 deliver weapons 27 via the monorail assembly 22 to a launch bay 28, preferably located near the aft end of the storage compartment. The carriage trucks 26 have handling-release units 30 for picking up and moving weapons 27 within the storage compartment and for releasing the weapons 27 out the launch bay 28. A portion of the weapons are initially held by the handling-release units 30, while the remaining weapons are positioned on stationary support units 34 connected to a pallet 25. An automatic launching control system 36 causes translation of the carriage trucks 26 along the monorail assembly 22 and activation of the handling-release units 30 and the stationary support units 34. The carriage trucks 26 are used to transport weapons 27 to the launch bay 28 in a predetermined, sequential order. The carriage trucks may also be used initially to load weapons 27 in the storage compartment 16.

In more detail, FIGS. 1 and 2 illustrate a widebody aircraft 14 having a large storage compartment 16 available for carrying a multitude of weapons 27. The compartment is used as a cargo compartment or an tipper hold during conventional transport operations. The compartment preferably extends from a nose opening 40 located at the fuselage forward end to a launch bay 28 located along the aircraft underside near a rear pressure bulkhead 42. The nose opening 40 allows a work crew to easily load weapons into the compartment as described below. The location of the launch bay 28 along the aircraft underside allows the use of gravity to help launch weapons 27.

Figure 3:
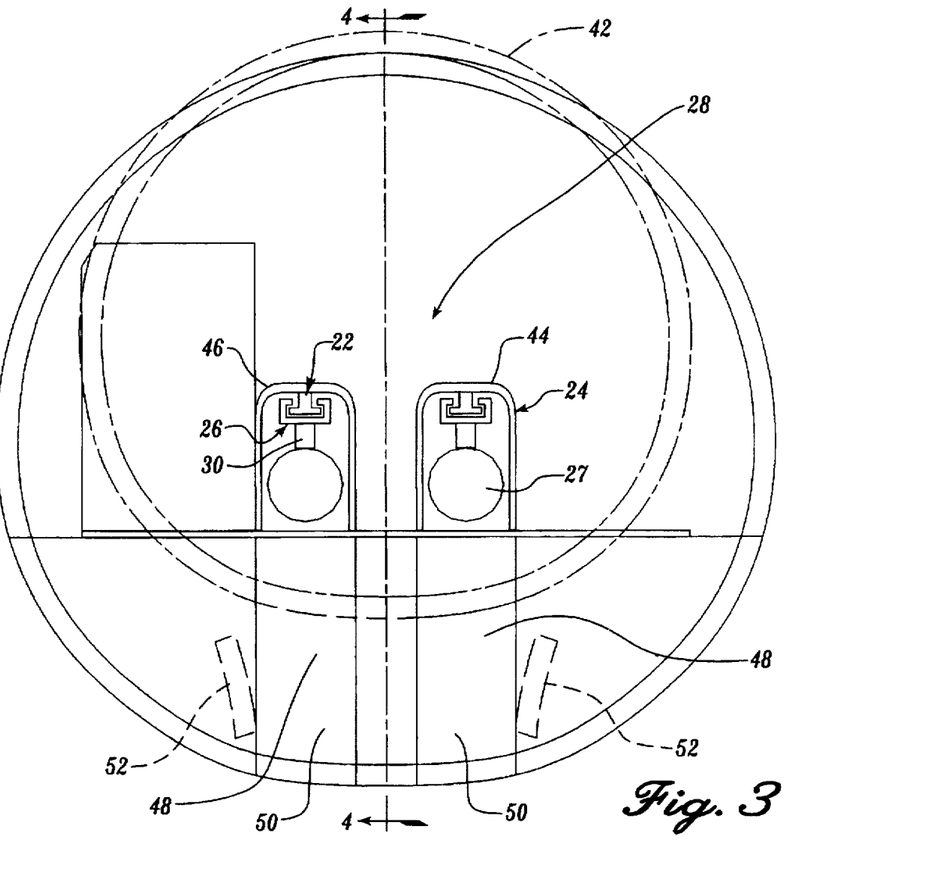
FIG. 3 is a cross-sectional view looking aft of a launch bay formed in accordance with the present invention, with portions shown in phantom.
Figure 4:
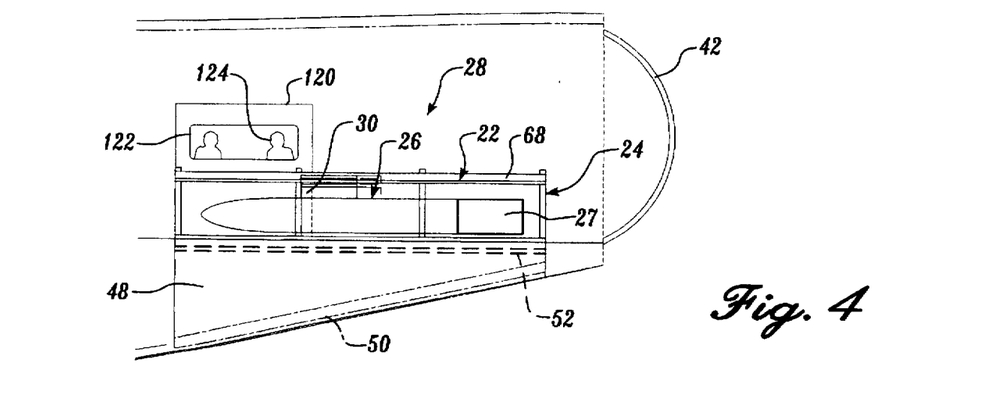
FIG. 4 is a side elevational view along line 4—4 of the launch bay of FIG. 3.

As shown in FIGS. 1, 3 and 4, the launch bay 28 includes two launch sites 44, 46 positioned laterally adjacent to one another and directly above massages 48 extending through the lower aircraft fuselage. An opening 50 in the passage at the lower fuselage surface is covered by a pair of plug-type doors 52 that react internal compartment pressure when closed. During release operations, the doors 52 retract to outboard side locations adjacent the passage 48, by rotating inwardly. This provides clearance for weapons released from the launch sites 44, 46 to drop through the passage 48 and out the opening 50 unimpeded. A shroud (not shown) may be attached to the rail frame 24 over the weapon launch bay 28 to limit wind blast into the storage compartment and to provide a safety barrier for personnel during operations.

Figure 5:
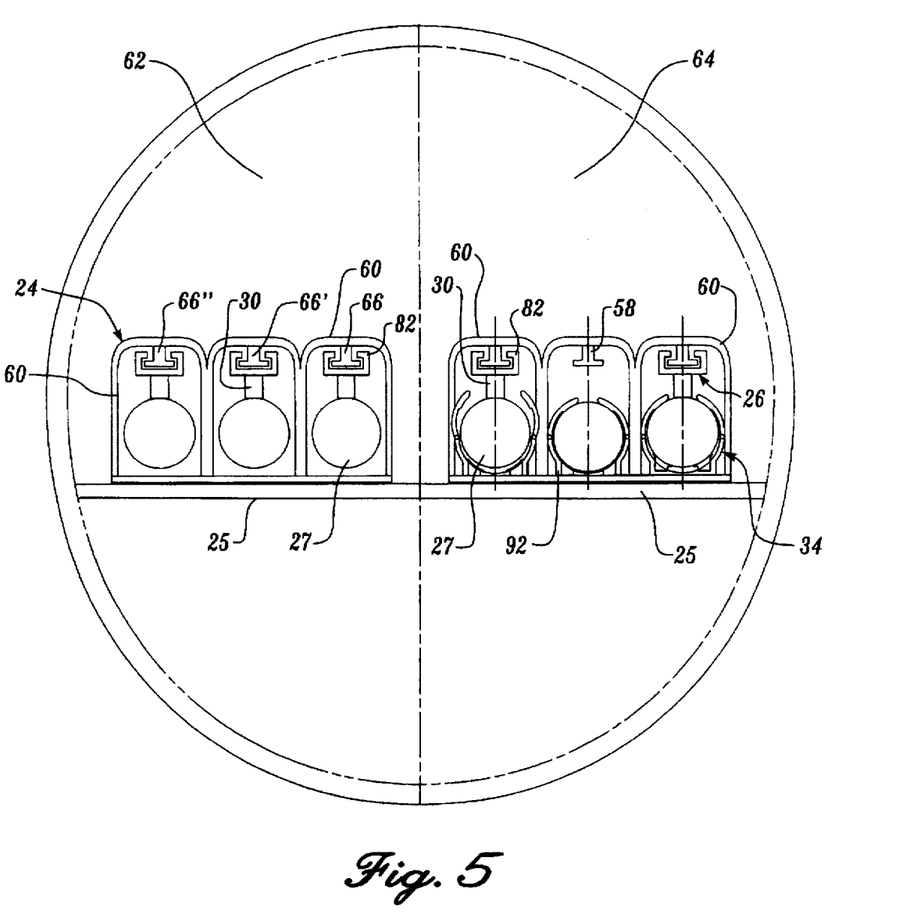
FIG. 5 is a cross-sectional view looking aft of a weapons launching system formed in accordance with the present invention.
Figure 6:
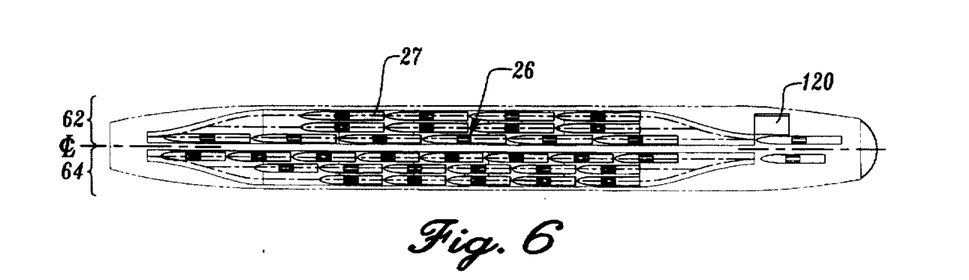
FIG. 6 is a plan view of an arrangement of weapons as formed in accordance with the present invention, two distinct arrangements of weapons being shown simultaneously for illustrative efficiency.
Figure 7:
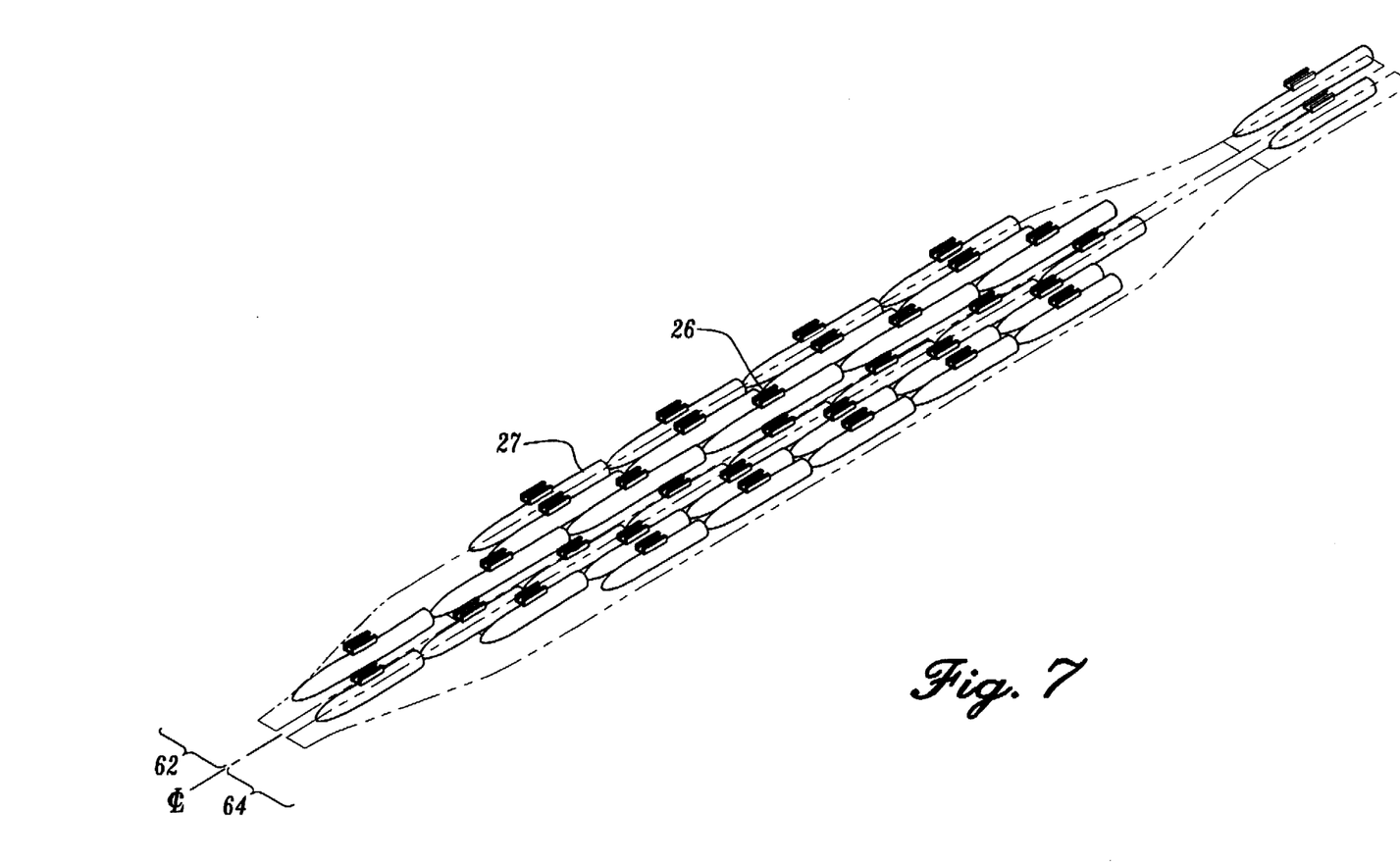
FIG. 7 is perspective view of the weapons arrangement of FIG. 6.
Figure 8:
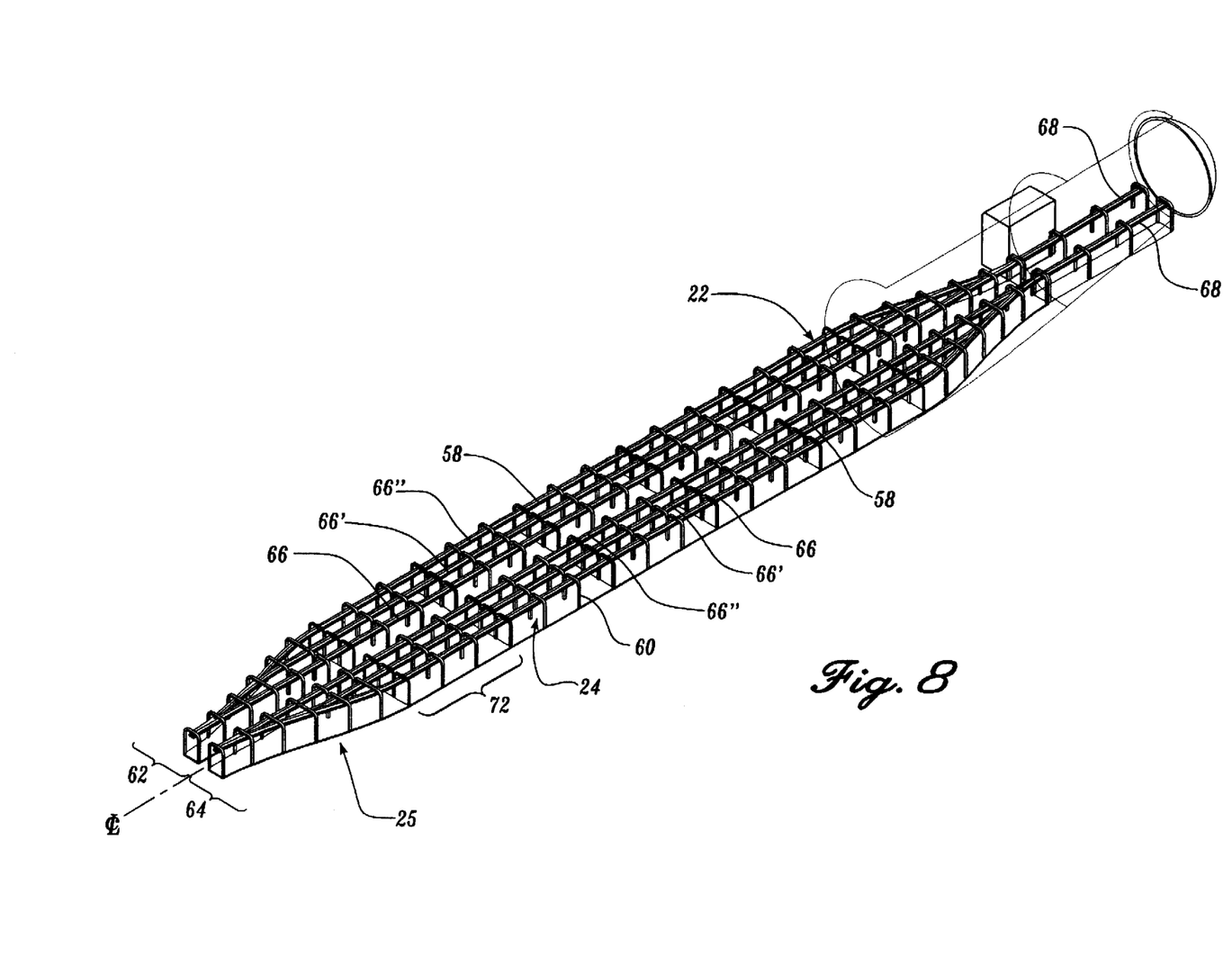
FIG. 8 is a perspective view of a monorail assembly and rail frame formed in accordance with the present invention.

Referring to FIG. 8, the monorail assembly 22 generally includes a number of interconnected monorails 58 supported by the rail frame 24. The rail frame 24 is rigid and is formed of interconnected structural beams 60 that are supported by pallet 25 as shown in FIG. 5. The pallet 25 may be formed of a dedicated structure or may be an existing compartment floor. The frame may be made from conventional materials such as aluminum, steel, composites, etc. The precise number of monorails 58 will vary according to space available in the storage compartment 16 and the number and size of the weapons 27 to be launched. For the widebody aircraft shown in FIGS. 6–10, the storage compartment is divided into right- and left-hand sections 62, 64 positioned on opposite sides of the aircraft longitudinal centerline, respectively, as viewed from in the plane and looking forward. Configuring the launch system symmetrically within the aircraft distributes loads during weapons delivery and is preferred over asymmetric layouts.

In a preferred embodiment shown best in FIG. 8, three monorails 66, 66', 66" span the longitudinal distance of each section. This results in a total of six monorails. Near the launch bay 28, the three monorails 66, 66', 66" converge to form a single monorail section 68 positioned directly above each launch site 44, 46. Other numbers of monorails 58 and other arrangements of interconnection may be used. As will be appreciated, the monorail assembly causes minimum impact to the basic airframe structure, systems, and non-military cargo-carrying capacity.

Figure 9:
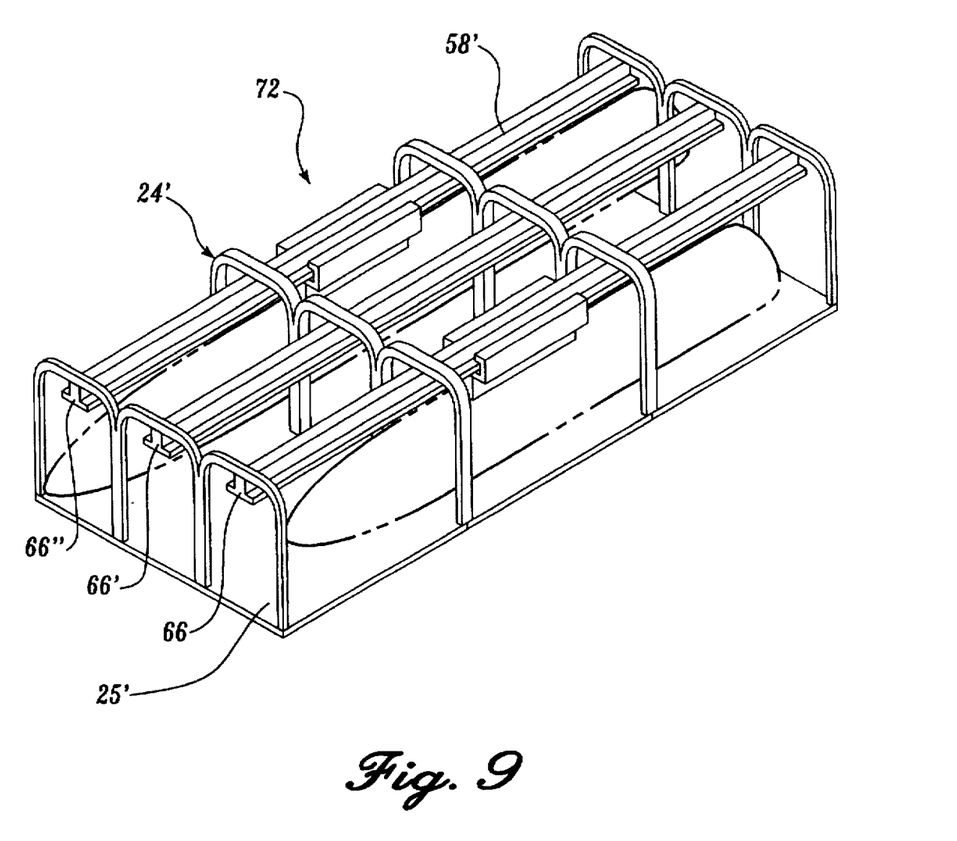
FIG. 9 is a perspective view of an individual unit formed in accordance with the present invention.

Referring to FIG. 9, in order to provide the capability to rapidly arrange the aircraft into a weapons delivery configuration, it is preferable that the monorail assembly 22, rail frame 24, and pallet 25 components be combined in the form of smaller, individual units 72, each individual unit 72 including monorail subsegments 58' that are mounted to subframe members 24' supported subpallets 25'. The preferred individual units 72 include laterally-spaced monorail subsegments 58' connected to the subframes 24' so as to align longitudinally between units 72 when installed in the storage compartment. The monorail subsegments 58' are attached to an upper portion of the rail subframe members 24' using conventional techniques.

The individual units 72 are positioned end-to-end and interconnected via conventional latching mechanisms. Various latching mechanisms are known, any one of which may be used in the present invention, e.g., an electromechanical latching mechanism. The latching mechanisms provide longitudinal restraint at the interface plane between units 72. Guide pins of one unit may be made to mate with side holes in the adjacent unit in order to provide alignment and lateral load transference between units 72. Depending on the automatic launching control system 36 used, an electrical connector may be necessary between units 72 to bridge power cables, fiberoptic connection, data communication links, etc., at each interface plane. To further facilitate short turn-around time, the units 72 are sized to fit through a cargo loading door, such as forward door 79 at nose opening 40 or side door 80, both shown in FIG. 2. When possible, it is preferred that the loading of the individual units 72 be accomplished using a cargo handling system, such as those available for palletized commercial cargo loading.

Figure 10:
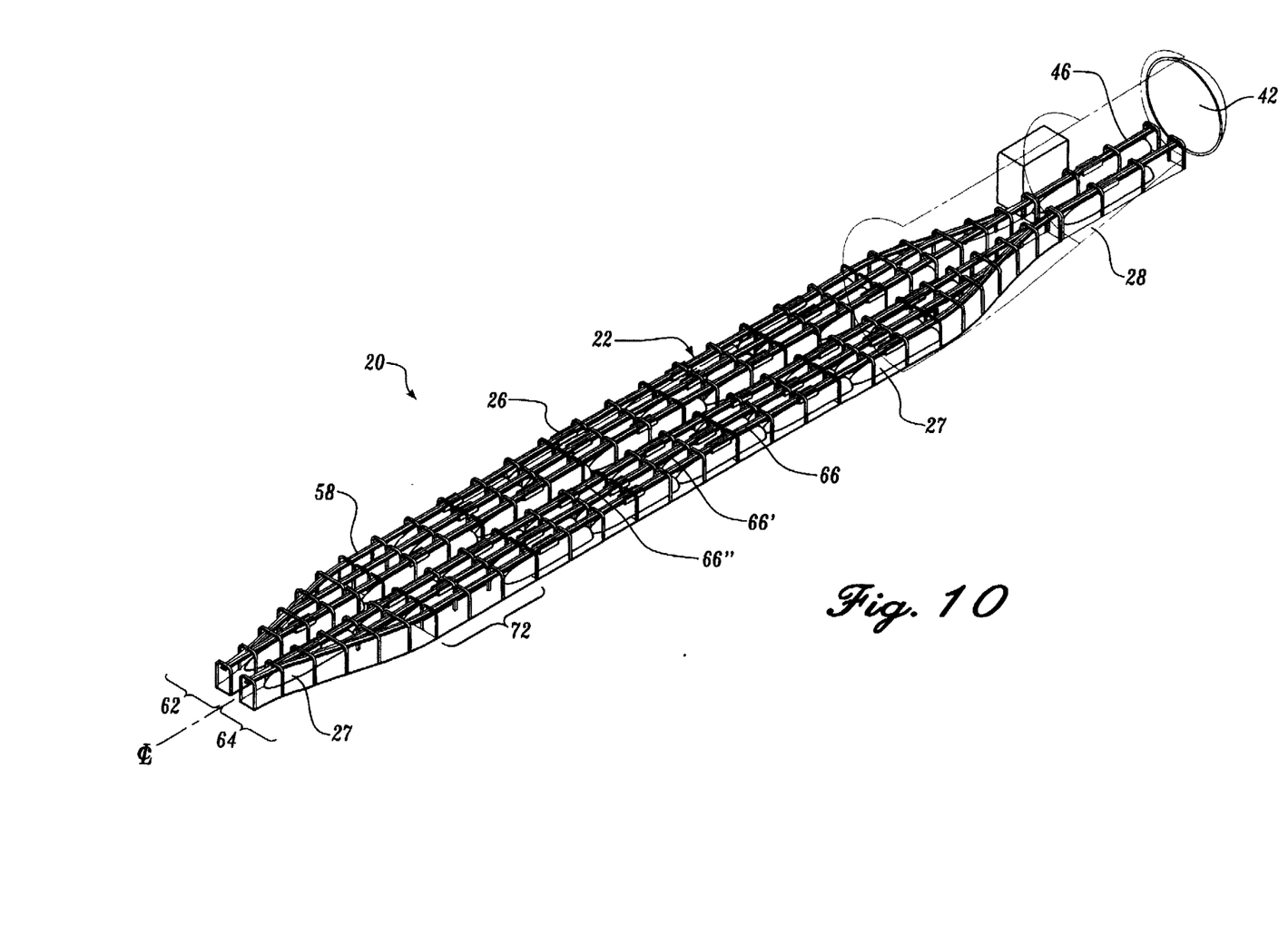
FIG. 10 is a perspective view of a weapons launching system formed in accordance with the present invention as applied to the two weapons arrangements of FIG. 6.

Referring to FIG. 10, a number of carriage trucks 26 are movably engaged with the monorail assembly 22 and are provided for delivering weapons 27 to the launch bay 28. As shown in FIG. 5, the carriage truck includes a yoke 82 slidably engaged with a monorail 58. Attached to the lower surface of the yoke 82 is a handling-release unit 30 capable of picking up a weapon 27 at a storage support unit, transporting the weapon to the launch bay, and releasing the weapon at the launch bay 28. The handling-release units may be formed of various known components. In one embodiment, the unit includes a rotatable hook (not shown) that extends downwardly from the lower surface of the yoke. The hook has a retracted position and an extended position. A weapon catch (not shown) located on the upper surface of each weapon is shaped to engage the hook, thereby allowing the weapon to hang from the handling-release unit 30 when the hook is in its extended position.

Figure 14:
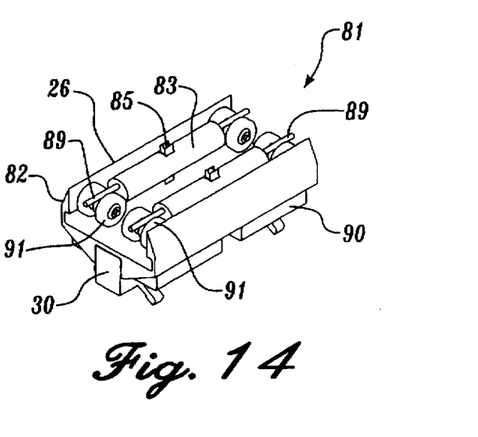
FIG. 14 is a perspective view of interior portions of the carriage truck of FIG. 13.

The carriage trucks 26 are driven by a drive assembly 81, such as the one shown best in FIG. 14. A motor and transmission assembly 83 is provided within each side region of the yoke. Power contact wheels 85 are located on the upper and lower regions of each motor and transmission assembly 83. Power strips 87 (see FIG. 12) are embedded in the monorails 58 to provide power to the carriage trucks 26 via these power contact wheels 85. A threaded drive shaft 89 extends from the front and rear ends of the motor and transmission assembly 83. Front and rear wheel pairs 91 are connected to the threaded drive shafts 89 in a worm gear arrangement. During use, the wheels pairs 91 contact the monorails and are driven by the motor and transmission assembly 83. Shown in FIG. 13, a housing 93 shields the upper surfaces of the drive assembly 81 from debris and moisture. The carriage trucks 26 additionally include communication mechanisms 15 for communicating with the automatic launching control system 36. Shown in FIGS. 12–14, an integrated control and power unit 90 is located under the yoke and includes sensors to sense the position of the weapon, to sense the state of the handling-release units and carriage truck, and to communicate this information to and from the automatic launching control system.

The preferred number of carriage trucks 26 is approximately one-half the total number of weapons to be carried in the storage compartment. Prior to launch, half the weapons 27 are attached to preassigned handling-release units 30 and the other half are supported and restrained by stationary support units 34 located at fixed positions on the pallet 25. Therefore, the number of stationary support units 34 approximates the number of carriage trucks 26. This preferred arrangement is based on a release sequencing technique for launching the weapons that is described below. Other arrangements may be used for other launching techniques.

In FIGS. 6–8 and 10, the compartment right-hand sides show an arrangement for carrying a total of forty weapons onboard a Boeing 747-400 (only twenty weapons are shown in these FIGURES since the right-hand side carries only half the stores). The weapons 27 are bullet-shaped cruise missiles that are 15 feet long and 2 feet in diameter. There are ten carriage trucks 26 and ten stationary support units 34 shown in the right-hand side. A more detailed description of this arrangement is provided with reference to FIG. 11 below. The left-hand sides show an arrangement for carrying a total of thirty weapons (only fifteen weapons are shown in these FIGURES since the left-hand side carries only half the stores). These weapons are 20 feet long and 2 feet in diameter. There are eight carriage trucks 26 and seven stationary support units 34. In general, any number of weapons 27 may be accommodated using the present invention, depending on the aircraft size, weapon size, and mission requirements.

In a preferred embodiment for use with bullet-shaped missiles, best shown in FIG. 5, each stationary support unit 34 includes a longitudinal support base 92 attached to the pallet 25. The base 92 has a semicircular cross-section and is sized to cradle a single weapon. Opposed arcuate arms 96 are rotatably connected to the base 92. The arm axes of rotation is generally parallel with respect to the aircraft longitudinal centerline. The arms 96 clamp a weapon 27 toward the base 92 to restrain the weapon from movement. A distance 98 is maintained between the outer ends of the arms 96 to accommodate the handling-release units 30 as they pick up and release the weapon. Both the base 92 and the arms 96 may include cushioning material along their weapon-contacting surfaces.

During weapons loading, the arms 96 are initially open to allow a carriage truck to easily deliver a weapon to the stationary support unit 34 by inserting the weapon between the arms 96 from directly above the base 92. This is shown at the innermost weapon location of the compartment's left-hand side 64 of FIG. 5. The handling/release unit 30 lowers the weapon 27 a short distance onto the base 92. The arms 96 are then clasped about the weapon. This is shown at the middle weapon location of the compartment's left-hand side 64 in FIG. 5.

To pick up a weapon, a carriage truck moves directly over a weapon. The handling-release unit 30 is activated to engage the weapon. Upon sensing positive engagement, the integrated control and power unit 90 causes the handling-release unit 30 to lift the weapon slightly from the stationary support unit. Simultaneously, the stationary support unit arms 96 rotate open slightly to accommodate the upward movement of the weapon. This is shown at the outermost weapon location of the compartment's left-hand side 64 in FIG. 5. The arms 96 rotate to full open when the integrated control and power unit 90 determines that the carriage truck 26 is cleared to translate.

The precise location of the stationary support units 34 complements the desired launch sequence. In general, the sequence follows a predefined pattern to first launch those weapons attached to the carriage trucks 26. This is generally referred to as the first half of the launch sequence. Next, the empty trucks pick up the weapons at the stationary support unit 34 and move the weapons to the launch bay 28 during the second half of the launch sequence. A specific truck is assigned to transport a specific weapon. The carriage trucks 26 unload weapons simultaneously from different sections of the storage compartment, preferably in a staggered sequence manner that balances loads and forces and ensures weapon separation in the near airplane flowfield. In the monorail assembly and rail frame embodiments of FIGS. 3-13, balance is accomplished by having the carriage trucks 26 simultaneously (albeit in alternating fashion) unload weapons from the right- and left-hand sides 62, 64 of the storage compartment.

Figure 11:
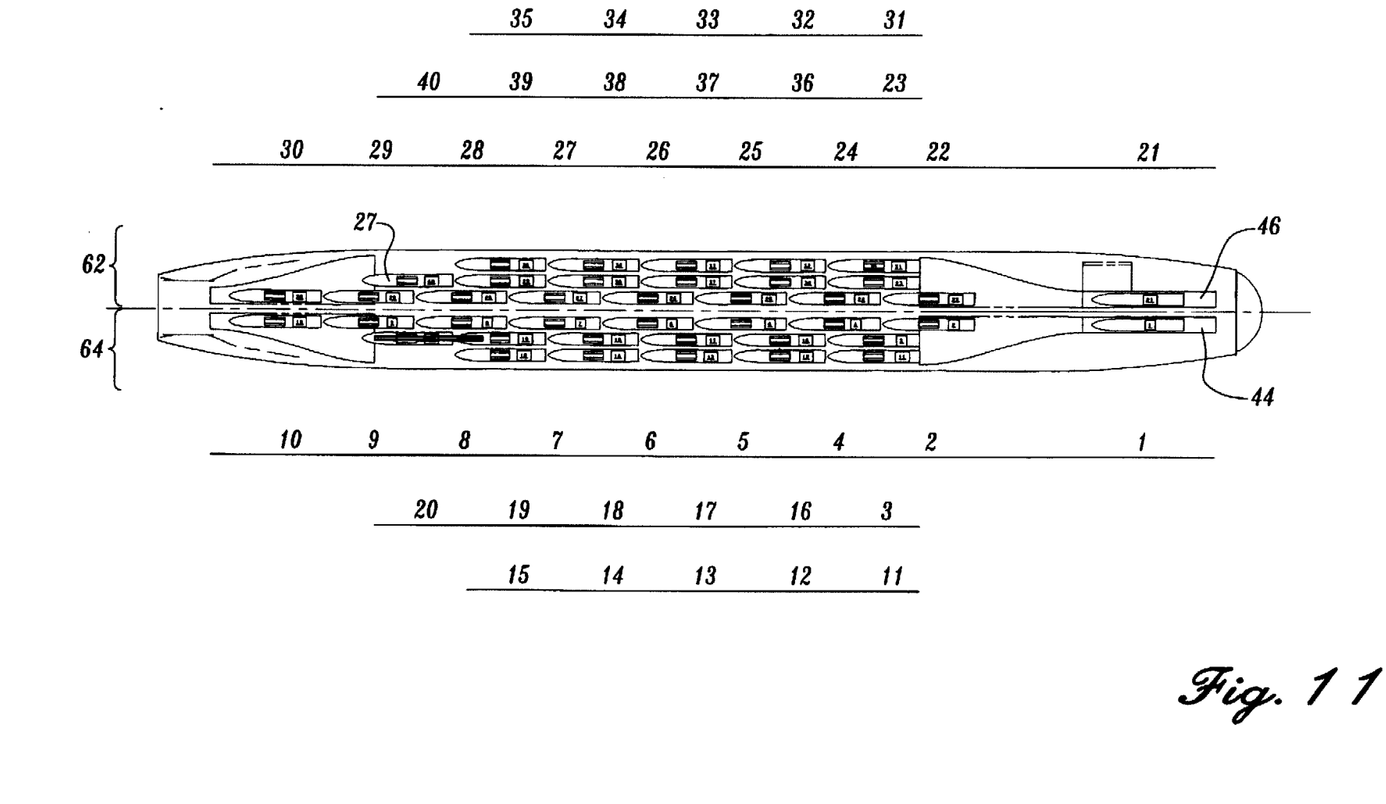
FIG. 11 is a plan view of one embodiment of an arrangement of forty missiles formed in accordance with the present invention, weapon numbering being provided alongside the aircraft.
Figure 12:
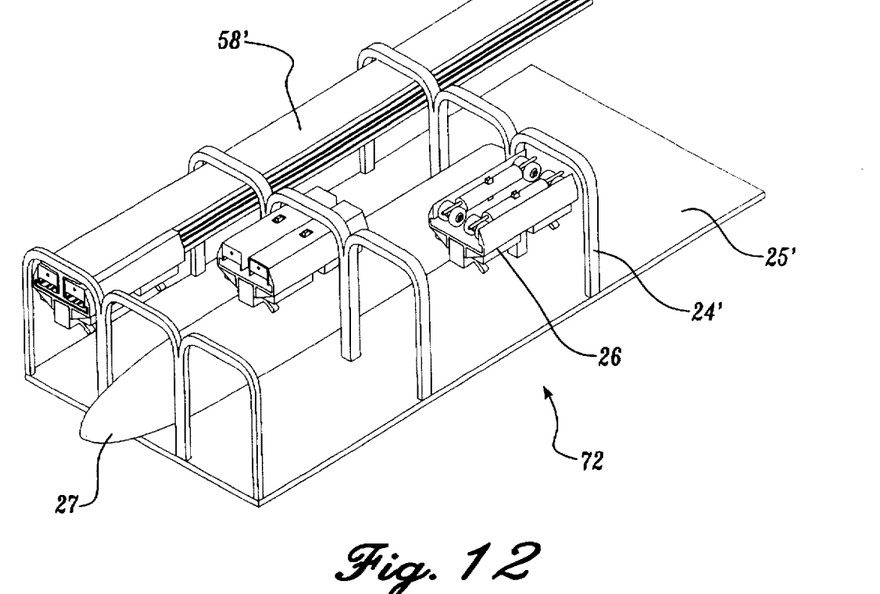
FIG. 12 is a perspective view of one embodiment of a carriage truck formed in accordance with the present invention as attached to a embodiment of an individual unit formed in accordance with the present invention.
Figure 13:
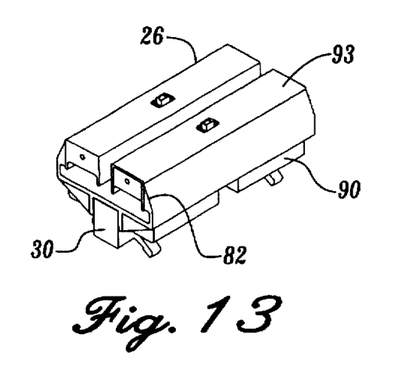
FIG. 13 is a perspective view of the carriage truck of FIG. 12.

FIG. 11 and Table 1 illustrate one arrangement for launching forty weapons. The weapons are initially positioned in the storage compartment such that weapons 1–40 are positioned at compartment locations 1–40. Weapons 1–10 and 21–30 are attached to trucks numbered 1–20 consecutively. Weapons 11–20 and 31–40 are secured on stationary support units located at compartment locations 11–20 and 31–40, respectively (i.e., the outer two monorails of the right-and left-hand sections 62, 64).

The preferred release sequence first unloads the weapons inboard (i.e., weapons 1–10 and 21–30). Once a handling-release unit has delivered a weapon to the launch site, the unit moves to its next compartment location to pickup its next weapon to be delivered. Table 1 below correlates the weapons numbered in FIG. 11 with the carriage trucks. For example, in Table 1, handling-release unit number 2 first delivers weapon number 2, then moves to pickup weapon number 14, and finally retires to location 7. Weapons are preferably released in the staggered sequence of Table 1(i.e., time moves forward in going down the table). A release sequence for the thirty weapon configuration may be defined similar to the forty weapon release sequence. It is important that the final carriage truck position be defined to ensure that no carriage truck interferes with the required movement of any other carriage truck to or from the launch bay.

TABLE 1

| Left Hand Side | | | Right Hand Side | | |
|---|---|---|---|---|---|
| Compartment Location and Weapon Number | Truck Number | Truck Final Location | Compartment Location and Weapon Number | Truck Number | Truck Final Location |
| 1 | 1 | 6 | 21 | 11 | 26 |
| 2 | 2 | 7 | 22 | 12 | 27 |
| 3 | 3 | 8 | 23 | 13 | 28 |
| 4 | 4 | 9 | 24 | 14 | 29 |
| 5 | 5 | 10 | 25 | 15 | 30 |
| 6 | 6 | 11 | 26 | 16 | 31 |
| 7 | 7 | 12 | 27 | 17 | 32 |
| 8 | 8 | 13 | 28 | 18 | 33 |
| 9 | 9 | 14 | 29 | 19 | 34 |
| 10 | 10 | 15 | 30 | 20 | 35 |
| 11 | 5 | | 31 | 15 | |
| 12 | 4 | | 32 | 14 | |
| 13 | 3 | | 33 | 13 | |
| 14 | 2 | | 34 | 12 | |
| 15 | 1 | | 35 | 11 | |
| 16 | 10 | | 36 | 20 | |
| 17 | 9 | | 37 | 19 | |
| 18 | 8 | | 38 | 18 | |
| 19 | 7 | | 39 | 17 | |
| 20 | 6 | | 40 | 16 | |

As may be appreciated from the foregoing, various launch sequences may be formed according to the present invention. The important aspect is that all weapons are launched in a minimum of time and with a minimum of opportunity for malfunction. It is also important to design a particular sequence in a manner consistent with the static and dynamic loading characteristics of the aircraft.

Figure 15:
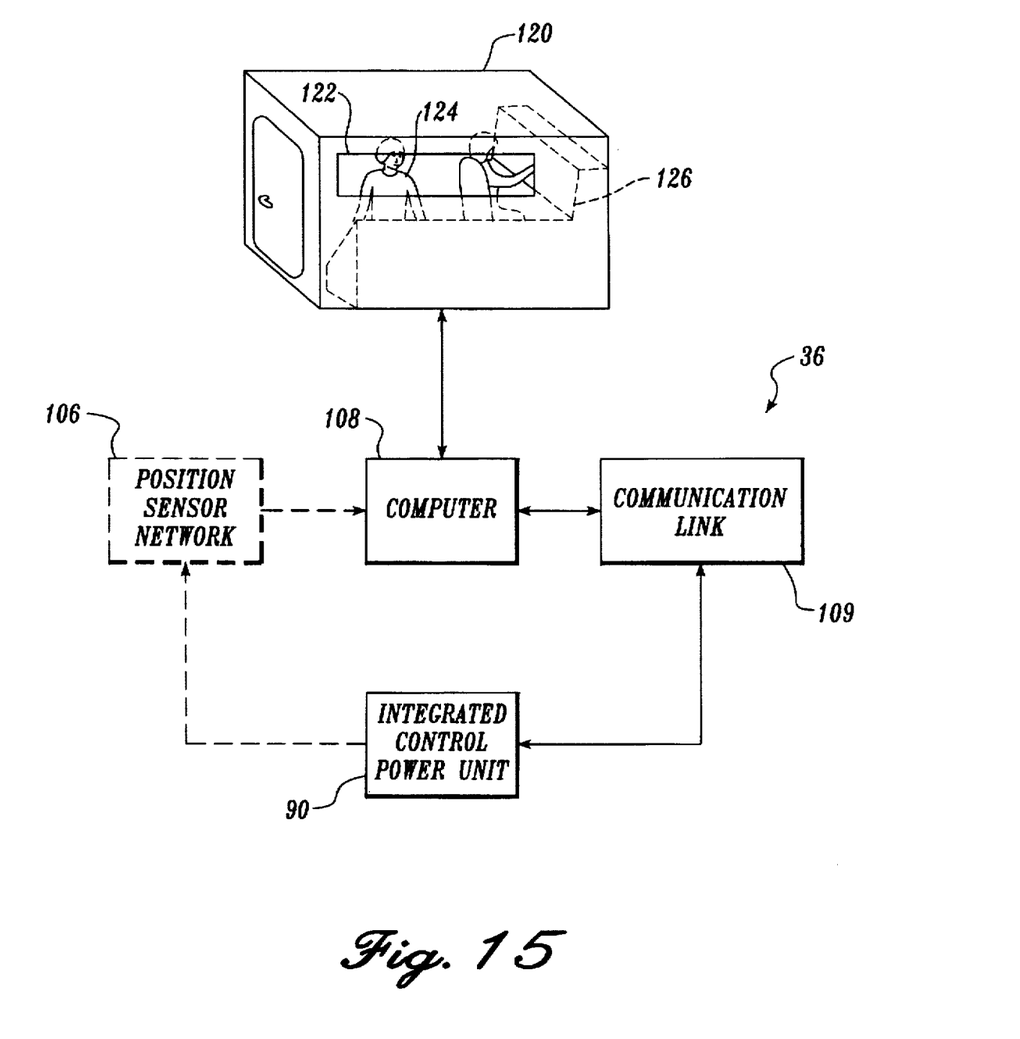
FIG. 15 is a block diagram of an automatic launching control system formed in accordance with the present invention.

Referring to FIGS. 4 and 15, a pallet-mounted operator's station 120 is located along one side of the storage compartment near the launch bay 28 for providing human control and monitoring of the weapons launch. The operator's station 120 is enclosed and separately pressurized. Additional oxygen should be available therein for emergency use. A window 122 allows an operator 124 to view the launch procedure. A control panel 126 within the station 120 is connected to the automatic launching control system 36. The control panel 126 allows the operator 124 to provide data and control inputs to the system and to receive outputs from the system.

The automatic launching control system 36 manages the launch sequence by controlling the pickup and release of weapons by the carriage trucks 26, and by controlling the translation of the carriage trucks 26 along the monorail assembly 22. The control system 36 may be configured using any one of a number of known components.

In a preferred embodiment shown in FIG. 15, the automatic launching control system 36 uses a digital computer 108 programmed to communicate with each carriage truck 26 via a communication link 109. The computer 108 includes software coding to perform the functions of acquiring, tracking, and maintaining control of the carriage trucks and hence the weapons' locations and movements. The computer 108 generates output commands (such as start, accelerate, decelerate, stop, reverse, pause, fast movement, slow movement, creep, etc.) that are sent via the communication link 109 to each truck. In a similar manner, the computer 108 receives input information from each truck integrated control and power unit 90 back through the communication link 109. In an alternative arrangement indicated in FIG. 15 in phantom lines, the computer 108 may receive input information from a separate truck position sensor network 106. The truck position sensor network 106 includes a series of small electronic units located at specific positions along the monorail that detect and read coded information attached to each carriage truck. Photoelectric units that read a bar code data set may be used for example. The electronic units are located at select points along the monorail system.

In preparation for a weapons launching mission, the storage compartment 16 is first emptied of its non-launching elements in order to provide space for the present invention system. The operator's station and the individual units 72 are then loaded through the nose opening 40 or cargo door 80. The operator's station and the individual units 72 are secured to the compartment floor and to each other. From a loading dock, carriage trucks 26 are engaged with the monorail assembly 22 and are then used to onload weapons 27 through the storage compartment nose opening 40 or cargo door 80. The automated launching control system 36 may be used to direct the carriage trucks 26 or this may be performed in an alternative method (e.g., a separate ground handling control unit or even manually). A primary consideration is the minimization of total turnaround time.

To accomplish the launch sequence, the storage compartment is depressurized and the launch bay doors 52 are opened. The doors 52 remain open until the entire launch sequence is complete. The automated launching control system 36 directs the carriage trucks 26 to move along the monorails 58 to pick up weapons at storage locations, to deliver weapons to the launch site 44, 46, and to release weapons at the launch site 44, 46. The weapons 27 are launched from the aircraft one at a time by falling through the passage 48 and out the plane. The off-loading is thus accomplished in a sequential, orderly manner. Approximately half the onloaded weapons are mated to carriage trucks 26 initially. These weapons are launched first. The other half of the weapons are located at stationary support units 34 and are picked up when a designated carriage truck 26 becomes available. By using a predefined launch sequence, the carriage trucks 26 avoid interference and storage space complications with the remaining onboard weapons.

As will be readily appreciated from the foregoing description, the present invention allows military planners the operational flexibility to configure large aircraft for both war and peacetime utility, as well as commercial and non-military utility. The present invention further provides a way to carry and deliver tactical cruise missiles from a standoff position and thus, provides a survivable weapon system capable of global reach in minimum response time with a minimum turn-around time in transitioning between aircraft configurations.

Advantages of the above-described preferred embodiments include minimum modification impact to freighter airframe structures and subsystems and minimum loss of cargo carrying capability. The embodiments are additionally less complicated than known weapon launching systems. Therefore, less time is required to arrange the aircraft in a missile launching configuration and to load weapons onboard, both initially and during reload. In addition, re-using carriage trucks 26 to launchweapons reduces the weight and cost associated with these parts. Launching all weapons is accomplished rapidly and requires no inflight physical contact with the weapons by the operating crew.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A weapons launching system for use in an aircraft having an internal storage compartment and a launch bay for releasing weapons, the weapons launching system comprising:
   (a) a monorail assembly comprising a plurality of interconnected monorails supported by a rail frame, the monorail assembly including at least one monorail extending to the launch bay;
   (b) a number of carriage trucks movably engaged with the monorail assembly for delivering weapons to the launch bay via the monorail assembly, each carriage truck having a handling-release unit, a portion of the total number of weapons onboard being attached to the handling-release units;
   (c) a number of stationary support units located in the rail frame, a portion of weapons onboard being supported by stationary support units; and
   (d) an automatic launching control system in communication with the carriage trucks for controlling the translation of the carriage trucks along the monorail assembly and for activating the handling-release units; wherein the carriage trucks are used and reused to deliver weapons to the launch bay.

2. The weapons launching system according to claim 1, wherein the carriage trucks pick up and release weapons in a predefined sequence.

3. The weapons launching system according to claim 1, wherein the number of carriage trucks is about one-half the maximum weapons capacity of the storage compartment.

4. The weapons launching system according to claim 1, wherein there are approximately equal numbers of support fixtures and carriage trucks.

5. The weapons launching system according to claim 1, wherein a monorail assembly, rail frame, and pallet are formed as an individual unit comprising at least one monorail subsegment mounted to a subframe member, the subframe member being supported by a subpallet; wherein a number of individual units are positioned end-to-end such that the monorail subsegments align longitudinally between individual units.

6. The weapons launching system according to claim 5, wherein a portion of the total number of individual units includes three laterally-spaced monorails connected to an upper region of the subframe.

7. The weapons launching system according to claim 5, wherein a portion of the total number of individual units includes at least one stationary support unit connected to a lower region of the subframe.

8. The weapons launching system according to claim 1, wherein each stationary support unit comprises a semicircular base having opposed restraing. arms for securing the weapon in a stationary position by clasping the weapon between the restraining arms and holding the weapon on the semicircular base.

9. The weapons launching system according to claim 8, wherein the monorails are attached to an upper portion of the rail frame the rail frame is supported on a pallet, and the stationary support units are attached to one of the rail frame and the pallet at a location directly beneath a monorail.

10. A weapons launching system for use in an aircraft having an internal storage compartment with a launch bay for releasing weapons, the weapons launching system comprising:

(a) a monorail assembly comprising a plurality of interconnected monorails located within the storage compartment; the monorail assembly including at least one monorail extending to the launch bay;

(b) a number of carriage trucks movably engaged with the monorail assembly for delivering weapons to the launch bay via the monorail assembly, each carriage truck having a handling-release unit, a portion of the total number of weapons onboard being attached to the handling-release units; and    (c) an automatic launching control system in communication with the carriage trucks for controlling the translation of the carriage trucks along the monorail assembly and for activating the handling-release units;

wherein at least a portion of the carriage trucks are used and reused to deliver weapons to the launch bay.

11. The weapons launching system according to claim 10, wherein the number of carriage trucks includes a number approximately half the total weapons capacity of the storage compartment, the remaining weapons being supported by stationary support units positioned within the storage compartment.

12. The weapons launching system according to claim 10, wherein the monorail assembly comprises at least six interconnected monorails and the number of carriage trucks is between about 18 to 24 trucks.

13. The weapons launching system according to claim 10, wherein two monorails have a portion located near the launch bay; and the carriage trucks unload weapons from left- and right-hand portions of the storage compartment in alternating fashion.

14. The weapons launching system according to claim 10, wherein the monorail assembly comprises at least six interconnected monorails and the number of carriage trucks is between about 8 to 16 trucks.

15. The weapons launching system according to claim 14, wherein two monorails have portions located near the launch bay; and the carriage trucks unload weapons from left- and right-hand portions of the storage compartment in alternating fashion.

16. A method of launching weapons from an aircraft storage compartment through a launch bay comprising: attaching a number of weapons to a number of carriage trucks translatable on a monorail assembly located in the storage compartment, delivering the attached weapons in a sequential manner, launching the weapons attached to the carriage trucks, returning the carriage trucks from the launch bay via the monorail assembly, supplying weapons to the returned carriage trucks from stationary support units, and delivering additional weapons positioned in the storage compartment to the launch bay.

17. The weapons launching system according to claim 16, wherein there are approximately twice as many weapons as there are carriage trucks.

18. The weapons launching system according to claim 17, wherein the number of carriage trucks is in the range of about 16 to about 20 trucks.

* * * * *

UNITED STATES PATENT AND TRADEMARK OFFICE
CERTIFICATE OF CORRECTION

PATENT NO. : 5,763,811
DATED : June 9, 1998
INVENTOR(S) : D.E. Ruzicka

It is certified that error appears in the above-identified patent and that said Letters Patent is hereby corrected as shown below:

COLUMN     LINE

11     1     "restraing," should read --restraining--
(Claim 8, line 3)

11     7     "rail frame" (first instance) should read --rail frame,--
(Claim 9, line 3)

Signed and Sealed this

First Day of September, 1998

Attest:

BRUCE LEHMAN

*Attesting Officer*     *Commissioner of Patents and Trademarks*